United States Patent [19]

Hayward et al.

[11] Patent Number: 5,727,391
[45] Date of Patent: Mar. 17, 1998

[54] DEFORMABLE STRUCTURAL ARRANGEMENT

[75] Inventors: Vincent Hayward; Danny Grant, both of Montreal, Canada

[73] Assignee: McGill University, Montreal, Canada

[21] Appl. No.: 541,195

[22] Filed: Oct. 16, 1995

[51] Int. Cl.[6] .................................................. F01B 29/10
[52] U.S. Cl. ........................ 60/528; 248/636; 267/140.13
[58] Field of Search ................ 60/527, 528; 267/140.11, 267/140.13, 148; 248/562, 636

[56] References Cited

U.S. PATENT DOCUMENTS

| | | | |
|---|---|---|---|
| 4,700,540 | 10/1987 | Gabriel et al. | 60/527 |
| 4,792,173 | 12/1988 | Wilson | 92/92 |
| 4,988,244 | 1/1991 | Sheldon et al. | 409/132 |
| 5,080,000 | 1/1992 | Bubic | 92/92 |

FOREIGN PATENT DOCUMENTS

| | | |
|---|---|---|
| 0137502 | 4/1985 | European Pat. Off. . |
| WO 87/01645 | 3/1987 | WIPO . |
| WO 94/04844 | 3/1994 | WIPO . |

*Primary Examiner*—Noah P. Kamen
*Attorney, Agent, or Firm*—Swabey Ogilvy Renault

[57] ABSTRACT

An actuator develops a displacement from a force; the actuator employs active tension elements which comprise a fiber or fibers which shorten under activation, for example, shape memory alloy fibers; the fiber or fibers are entrained between opposed, spaced apart support members, typically a stack of spaced apart disks; the entrained fiber or fibers define a cage of crossing lengths of fiber in symmetrical array, typically a helicoidal array. Activation of the fibers shortens the fiber lengths producing a relative displacement of the support members which can be translated to a component which is to be displaced, and to which the actuator is operably connected, in another embodiment the active tension elements stretch under stress so that instead of an actuator there is formed a shock absorber which eliminates displacement with a force.

26 Claims, 9 Drawing Sheets

FIG_3

FIG_4A

FIG_4B

FIG_11A  FIG_11B

FIG_12A  FIG_12B

FIG_13A  FIG_13B

DEFORMABLE STRUCTURAL ARRANGEMENT

BACKGROUND OF THE INVENTION i) Field of the Invention

This invention relates to a deformable structural arrangement, an assembly incorporating the arrangement, an assembly to provide force upon activation, a method of effecting a transformation between force and displacement, and to a method to amplify efficiently, small displacements of force producing elements; the invention is more especially concerned with an actuator or shock absorber.

ii) Brief Description of Prior Art

Miniature robotic systems have a need for powerfull, compact, lightweight actuators. Conventional techniques such as electric, hydraulic, and pneumatic actuators, suffer from a drastic reduction of the amount of power they can deliver as they scale down in size and weight.

Different actuator technologies, based on strain developing in certain materials have been investigated. In particular, Shape Memory Alloys (SMA) have a high strength to weight ratio which makes them ideal for miniature applications. A SMA fiber can achieve a pulling stress of 200 MPa. Comparing this to an electro-magnetic actuator, which can only achieve 0.002 MPa, this represents a $10^5$ increase in strength for a given cross sectional area.

Thin fibers of shape memory alloy can accomplish actuation by being pretreated to contract upon heating. The contraction is a result of the fiber undergoing a phase transition between its martensitic and austenitic phases. When in the cool phase (martensitic) the alloy is malleable and can easily be deformed by applying external stress. The original pretrained shape can then be recovered by simply heating the fiber above its phase transition temperature. Also, since the alloy is resistive it can easily be heated electrically.

The high strength to weight ratio of shape memory alloys is accompanied by several limitations. Shape memory alloys cannot sustain shape recovery after strains of more than a few percent, about 5% for a working life of thousands or millions of cycles. Activation is achieved by heating and cooling. Thus, a primary disadvantage of previously proposed actuators is that the displacement which can be achieved is small, and second the speed of displacement is moderate. They can however still be controlled through the use of feedback and other control techniques. The main physical limitation that needs to be overcome is the absolute percent strain. Shape memory alloys can achieve a workable strain of 5 percent. Many of the designs of actuators using shape memory alloys depend on mechanically amplifying the displacement either through the use of long straight fibers, through the use of spring coils, or through bistable devices.

SUMMARY OF THE INVENTION

It is an object of this invention to provide a deformable structural arrangement for effecting a transformation between force and displacement or distance.

It is a particular object of this invention to provide an actuator, more especially an actuator for effecting transformation between force and displacement or distance, or for trading efficiently force with displacement.

It is a further object of the invention to provide a shock absorber.

It is a further object of this invention to provide a device incorporating the actuator of the invention.

It is a still further object of this invention to provide a method of effecting a transformation between force and displacement.

A still further object of the invention is to provide such an actuator which is lightweight.

Still another object of the invention is to provide a deformable structural arrangement capable of effecting a high variation in displacement, especially from moderate variations in displacement of primary contractile or expanding elements.

It is still another object of the invention to provide actuation with high variation in displacement from thin fiber or fibers which thus can be activated rapidly by heat, or other means.

It is still another object of the invention to provide an actuator assembly which is compact.

In accordance with one aspect of the invention there is provided a deformable structural arrangement comprising: active element means operatively associated with passive support means, said active element means having a major axis adapted to change in length under activation, one of said active element means and said passive support means defining a cage of crossing lengths in symmetrical array, said cage surrounding an inner zone bounded by said active element means and said passive support means.

In accordance with one particular aspect of the invention, there is provided an actuator comprising at least one fiber which shortens under activation, entrained between at least first and second support members, said support members being in opposed, spaced apart relationship, the entrained at least one fiber defining a cage of crossing lengths of fiber in symmetrical array, said cage surrounding an inner zone between said support structure members.

In accordance with another aspect of the invention there is provided an actuator for development of a displacement from a force, comprising at least one fiber which shortens under activation, entrained under strain between at least first and second support members in a double helicoidal array, said support members being in opposed, spaced apart relationship, said double helicoidal array being effective to balance all radial components of tension forces of the at least one fiber.

Suitably the actuator may include means to urge the support members apart into the opposed, spaced apart relationship with the at least one fiber under strain.

In accordance with still another aspect of the invention, there is provided an assembly comprising a component to be displaced and an actuator to effect displacement of the component, the actuator being an actuator of the invention as described hereinbefore. The component is operably connected to the second support member such that displacement of the second member relative to the first member produces a corresponding displacement of the component.

In accordance with another aspect of the invention there is provided a structural arrangement comprising active elements made of at least one fiber which shortens under activation or stretches under stress, entrained between at least first and second support members made of compression members, the support members being in opposed, spaced relationship, the active elements defining a cage of crossing lengths in symmetrical array forming a double helical counter rotating pattern, the cage surrounding an inner zone free of interferences.

According to yet another aspect of the invention there is provided a method of developing a displacement from a force comprising providing at least one fiber which shortens under activation, entrained between at least first and second support members, the entrained at least one fiber defining a cage of crossing lengths of fiber in symmetrical array, and activating said at least one fiber to shorten said fiber lengths such that said second support is displaced towards said first support member.

In another aspect of the invention there is provided an actuator for development of a displacement from a force or a shock absorber for the elimination of a displacement with a force comprising active elements made of at least one fiber which shortens under activation or stretches under stress, entrained under stress between at least first and second support members in a double, counter-rotating helicoidal array, the support members being in opposed, spaced apart relationship, the helicoidal array being effective to balance all radial components of forces in the at least one fiber.

In still another aspect of the invention there is provided a method of eliminating a displacement with a force comprising providing active elements of at least one fiber which stretches under stress, entrained between at least first and second support members, the entrained at least one fiber defining a cage of crossing lengths of fiber in symmetrical array, and stressing the at least one fiber to stretch the fiber lengths thereby displacing the second support member away from the first support member to eliminate a displacement adjacent the second support member.

In yet another aspect of the invention there is provided a structural arrangement comprising active members which expand under activation or compress under stress, attached between at least first and second restraining harnesses or loops, the restraining harnesses or loops being in opposed, spaced relationships, the active members defining a cage of crossing lengths in symmetrical array forming a double helical counter-rotating pattern, the restraining harnesses or loops being made of tensile members disposed according to a star or polygonal regular configuration or made of disks, the cage surrounding an inner zone free of interferences.

In another aspect of the invention there is provided a method of realizing a device with magnified superelastic properties which can provide quasi constant force under large strain deformation of the active elements of at least one fiber which stretches under stress, entrained between at least first and second support member, the entrained at least one fiber defining a cage of crossing lengths of fiber in symmetrical array, and stressing the at least one fiber to stretch the fiber lengths thereby displacing the second member away from the first support member to counteract a displacement adjacent the second support member.

DESCRIPTION OF PREFERRED EMBODIMENTS WITH REFERENCE TO THE DRAWINGS

The invention is particularly described with reference to the embodiments in which the active elements are tensile elements, more especially a fiber or fibers of a shape memory alloy, which fibers shorten when heated, and the passive support is provided by compression members in the form of disks with notches for restraining the fiber or fibers under tension. It will be understood that other active tensile elements may be employed in the invention which may be shortened by an activation, for example, a piezo electric effect, magnetostriction effect, thermally expanding vessels or made of contractile polymers activated by electricity or light.

The fibers of shape memory alloy may typically nave a diameter of less than 1 mm. In general, the fibers will have a diameter of at least 2 microns and typically at least 20 microns. Suitably the fibers will have a diameter of 5 to 1000 microns, generally 5 to 150 microns, and preferably about 100 microns.

The fibers of shape memory alloy may suitably be NiTi fibers which shorten in length during transition between martensitic and austenitic phases of the alloy upon being heated.

Figure 1A:
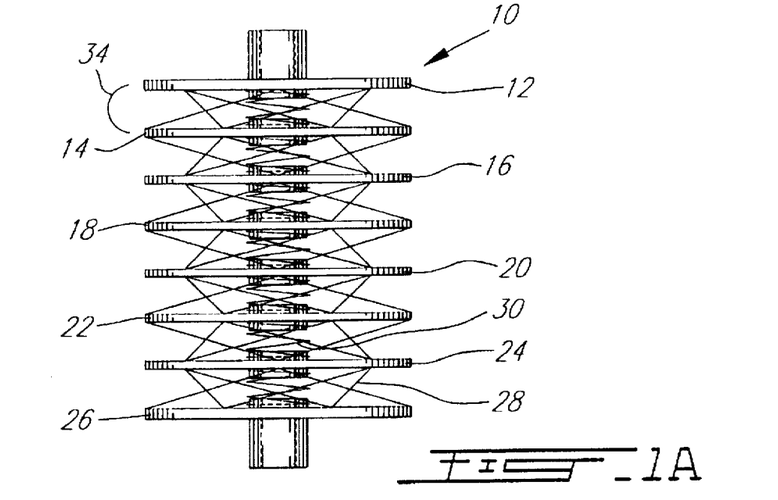
FIGS. 1A and 1B illustrate schematically in front and top elevation, respectively, an actuator of the invention.
Figure 1B:
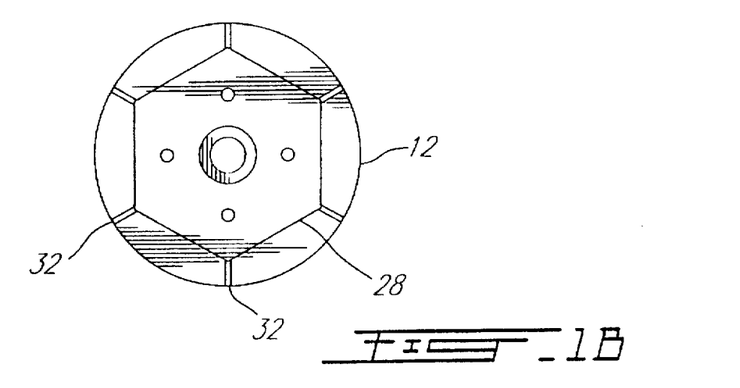

The actuator of the invention achieves mechanical motion amplification that is more compact than a long straight length of fiber, and more efficient than using spring coils. With further reference to FIGS. 1A and 1B, an actuator 10 comprises end supporting disks 12 and 26 and intermediate supporting disks 14, 16, 18, 20, 22 and 24 therebetween, a cell 34 is defined between each pair of disks, for example, disks 12 and 14 and twelve thin NiTi fibers 28 entrained in a counter rotating helical pattern around and between end supporting disks 12 to 26 by engagement with notches 32. The disks 12 to 26 are separated by preloading springs 30 that keep the fibers 28 under tension when relaxed. When the fibers 28 are heated, they contract pulling the disks 12 to 26 together. The weave pattern of the fibers 28 accomplishes an efficient displacement amplification. The abundant force of the alloy is being traded off for a displacement gain. This transformation between force and displacement is highly efficient since the only loss in work is due to the slight bending of the fibers 28. Unlike shape memory alloy coils, the entire cross section of the fibers 28 is performing work in the contraction. Coils suffer from the debilitating drawback of requiring a diameter larger than necessary. This is especially negative, when considering the response, since the response time is directly related to fiber diameter.

The response of the actuator 10 is limited by the cooling rate of the NiTi fibers 28, which directly depends on the surface area to volume ratio of fibers 28. The higher this ratio the more rapidly a fiber 28 will cool.

A great deal of the material is wasted in SMA coils since, during the shape memory effect, only the skin of the coil is actually contracting at the maximum amount. The internal diameter of the coil is acting both as a heat capacitance and as a source of an opposing force to the desired motion.

The weave pattern also results in an ideal "tensegrity" structure, with all compression members being passive and all tension members active, resulting in an optimal use of the material. Loosely speaking, this has a biological analogy seen in the skeletal arrangements of creatures with endoskeletons, where the muscles are the active tension members, and the bones are passive compression members.

Figure 2:
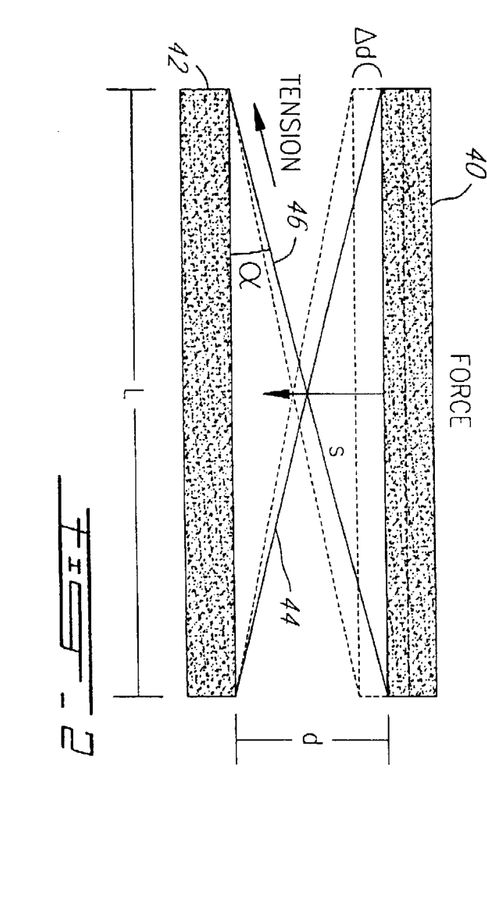
FIGS. 2, 2A, 2B, 2C and 2D illustrates schematically geometry which underlies the principle of operation of deformable structural arrangements of the invention.
Figure 2A:
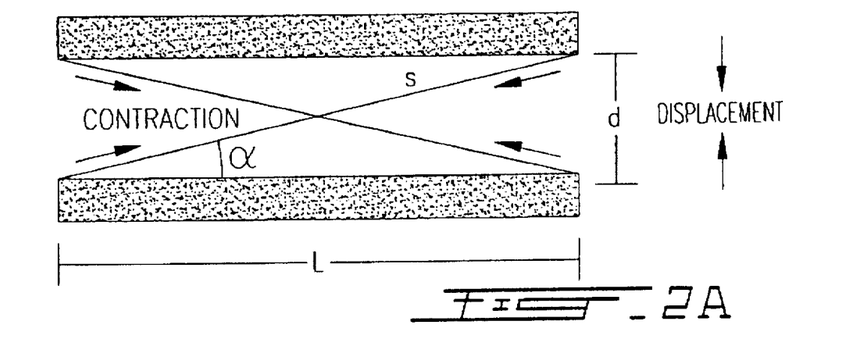

The displacement amplification can best be seen by considering the simplified case consisting of two beams and two fibers as shown in FIG. 2A.

In FIG. 2A, there is shown disks 40 and 42 with fibers 44 and 46, under tension, therebetween.

The variables are as follows:
L=diameter of disks
d=separating distance
α=angle of pitch
s=length of fibers As the fibers 44 and 46 contract, the disks 40 and 42 are pulled together. The displacement gain, Δd/Δs is defined as the change in stroke along the separating distance, divided by the change in the fiber length. Since ideally the motion is constrained along d:

$$s^2 = d^2 + L^2$$

$$\delta d/\delta s = \frac{s}{\sqrt{s^2 - L^2}}$$

but $s = L/\cos\alpha$, so, $$\frac{\delta d}{\delta s} = \frac{1}{\sqrt{1 - \cos\alpha^2}} = \frac{1}{\sin\alpha}$$

Figure 3:
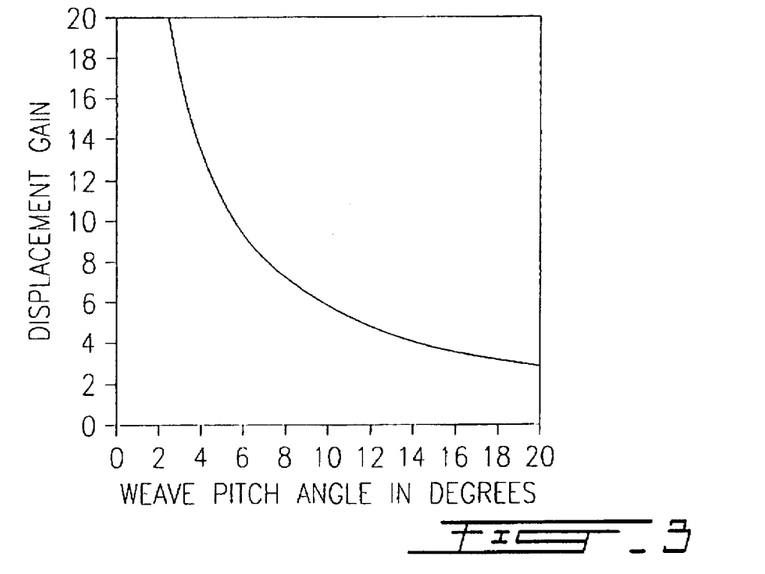
FIG. 3 is a graphical plot of displacement gain against weave pitch angle achieved by means of the invention.

The displacement gain is inversely proportional to the sine of the weave pitch. As the disks 40 and 42 get closer together the displacement gain dramatically increases as seen in FIG. 3, asymptotically approaching infinity.

The helicoidal weave pattern of the actuator in FIGS. 1A and 1B achieves a displacement amplification for each cell of the actuator. All the radial components of the tension forces of the twelve fibers 28 cancel, leaving only a common axial force component. In this manner the displacement gain allows the actuator to have an overall strain greater than 5%, while the force attenuation is compensated by using several fibers pulling collectively. The displacement gain also allows the fibers to operate at reduced percent strain, and since the cycle lifetime of the fibers increases dramatically at a lower than absolute strain, the cycle lifetime is also increased correspondingly. FIG. 1A represents only one configuration of the possible parameters of actuator 10. The supporting disk size and spacing, the number of fibers, and the displacement gain are all adjustable parameters.

Figure 4A:
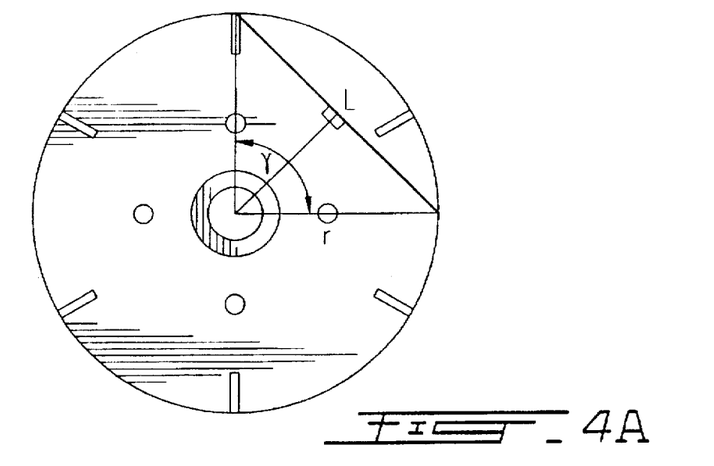
FIGS. 4A and 4B illustrate schematically in top and front elevations the variables in the design of an actuator of the invention.
Figure 4B:
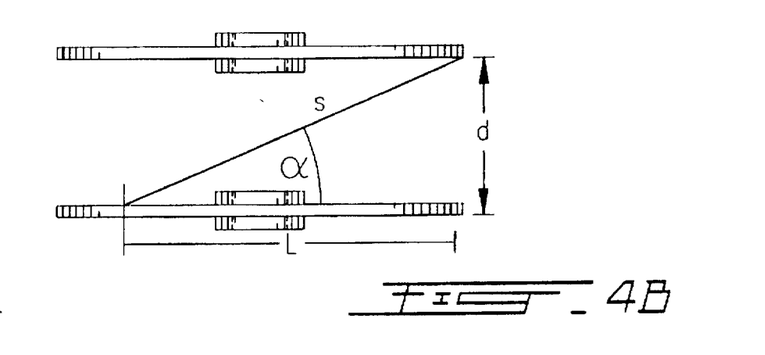

FIGS. 4A and 4B define the variables involved, highlighting only one of the fibers in a single actuator cell.

With further reference to FIGS. 4A and 4B, the variables are as follows:
L=length of fiber along disk
r=disk radius
γ=offset angle between successive disks s=length of fiber
d=interdisk separation
α=weave pitch angle Equation (1) shows that the displacement gain is inversely proportional to the sine of the weave pitch. The weave pitch in turn is dependent on the fiber weave pattern and the radius and spacing of the supporting disks. From FIGS. 4A and 4B, it can be seen that trigonometry gives us the following equation for the weave pitch:

$$\alpha = \arctan(d/L)$$

The weave pattern is determined by the number of notches around the disk, and the relative alignment of successive disks. The offset angle, γ, is the angle between notches of successive disks in the actuator. The length along the disk can be found by the following:

$$L = 2r \cdot \sin(\gamma/2)$$

Putting all this together results in the following equation for the displacement gain:

$$\frac{\delta d}{\delta s} = \frac{1}{\sin\left(\arctan\left(\frac{d}{2r\sin\left(\frac{\gamma}{2}\right)}\right)\right)}$$

The displacement gain can with respect to L and d be given by:

$$\frac{\delta d}{\delta s} = \frac{\sqrt{L^2 + d^2}}{d} = \sqrt{\frac{L^2}{d^2} + 1}$$

Figure 5:
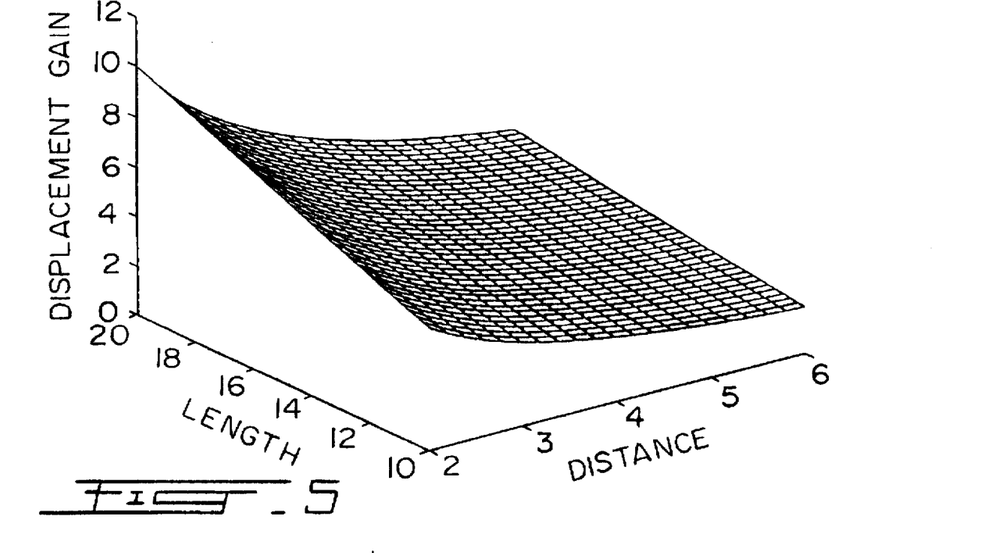
FIG. 5 is a plot demonstrating how displacement gain may be selected by a choice of tensile element length and compression member separating distance in the invention.

FIG. 5 shows the displacement gain plotted against the separation distance d, and the length along the disk L, with a normalized radius.

The displacement gain can be augmented by increasing the offset angle, or by decreasing the inter-disk distance. There are of course limits on both of these parameters. As the offset angle approaches 180 degrees, the fibers approach the axis of the disks. This causes the structure to become less stable and reduces the available space in the center for the placement of the springs and/or a position sensor, (an ideal place for a sensor). The radius of the inner bounding cylinder, shown in FIG. 6, can be found by trigonometry to be $r_i = r \cdot \cos\gamma$ where r is the disk radius and γ is the offset.

Figure 6:
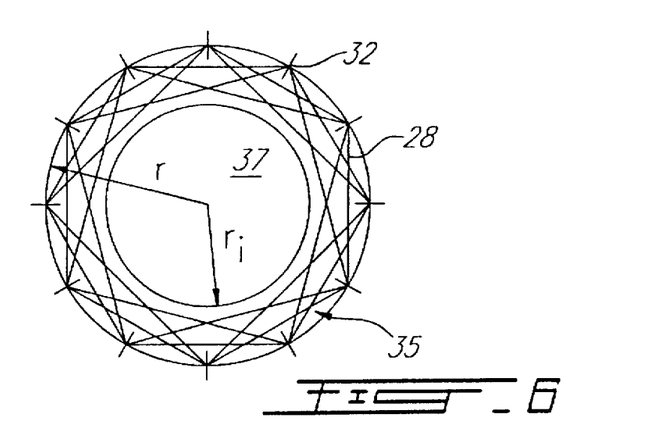
FIG. 6 illustrates the cage formation in an actuator of the invention.

As illustrated in FIG. 6, a cage 35 of the entrained fibers 28 is formed, with an inner zone 37 within and surrounded by cage 35.

Decreasing the distance in between the disks dramatically increases the displacement gain but limits the amount of stroke per cell. If the disks begin their motion very close to one another they can only move a small distance before they come in contact with one another. The available stroke per cell can be increased by either increasing the offset angle or increasing the disk radius.

The weave pattern of the actuator determines how many fibers are to be used collectively, and affects the displacement gain through the choice of the offset angle. Numerous configurations result in a stable weave pattern that will operate much like the actuator 10 illustrated in FIGS. 1A and 1B.

For the actuator 10 in FIGS. 1A and 1B, eight supporting disks 12 to 26 were chosen with 6 notches, 32 per disk, each spaced apart. A prototype actuator 10 was constructed by aligning the disks vertically so that each successive disk was offset by 30 degrees. The weave pattern was obtained by threading a single fiber 28 along the notches 32 of the eight disks 12 to 26. Adjacent disks 12 to 26 were connected by the fiber 28 through notches 32 that were separated by an offset angle of 90°. The two end disks 12 and 26 were woven along successive notches as shown in FIG. 1B.

Figure 7:
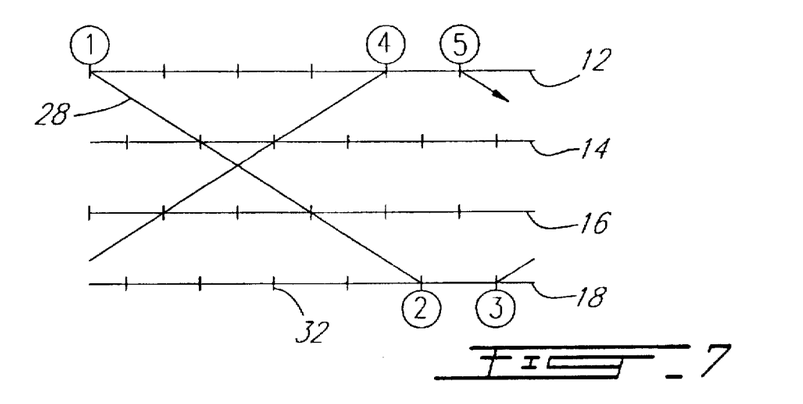
FIG. 7 is a simplified representation of a four disk actuator with the disks unraveled.

To get a better idea of how the fibers are woven, imagine the disks of the actuator rolled out so that they are flat. FIG. 7 shows a four disk actuator with the disks 12, 14, 16 and 18 unraveled. The fiber weave would begin at an end disk 12 and pass through the successive points 1 through 5. The fiber 28 would then continue going back and forth between the two end disks 12 and 18 until it arrived back at its starting position. The final result is twelve tensile elements made of a single fiber 28 woven in counter helical rotations such that all radial forces cancel out upon contraction.

Figure 8A:
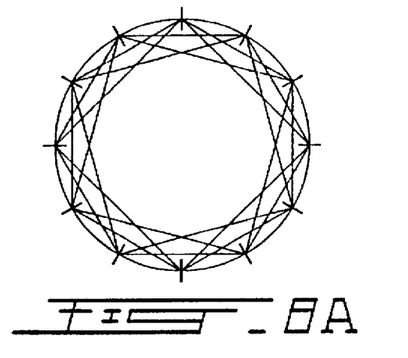
FIGS. 8A and 8B, 9A and 9B, 10A and 10B, 11A and 11B, 12A and 12B, 13A and 13B, 14A and 14B, 15A and 15B, 16A and 16B, 17A and 17B, 18A and 18B, and 19A and 19B, and 20A and 20B, show top views of a completed fiber weave and the corresponding unraveled disk, respectively, of an actuator of the invention.
Figure 8B:
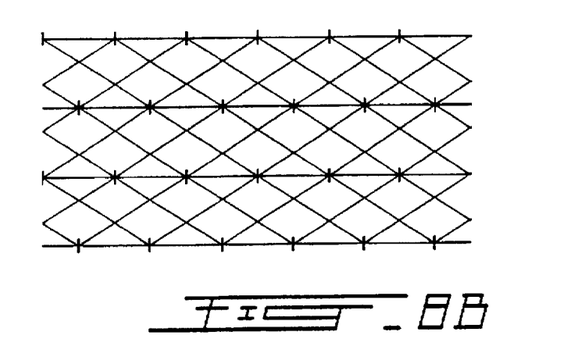
Figure 9A:
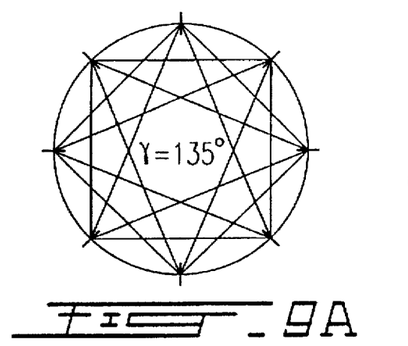
Figure 9B:
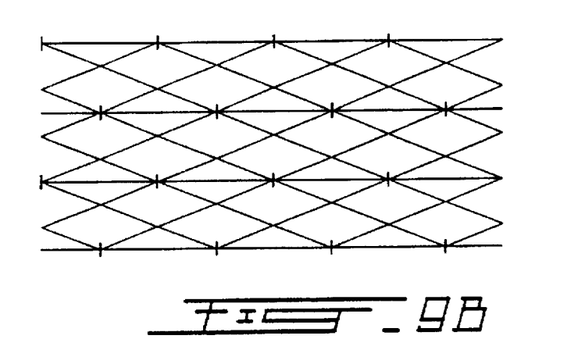
Figure 10A:
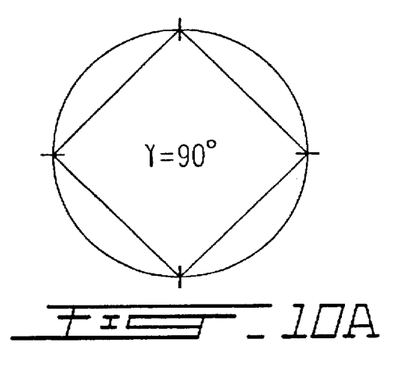
Figure 10B:
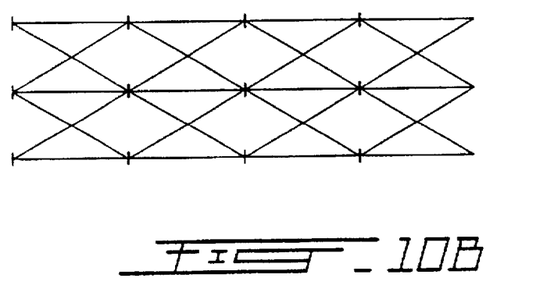
Figure 11A:
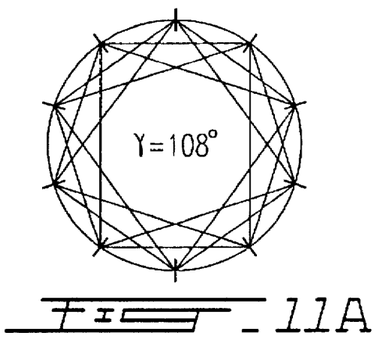
Figure 11B:
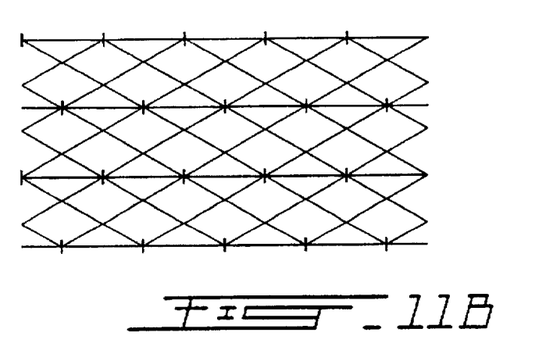
Figure 12A:
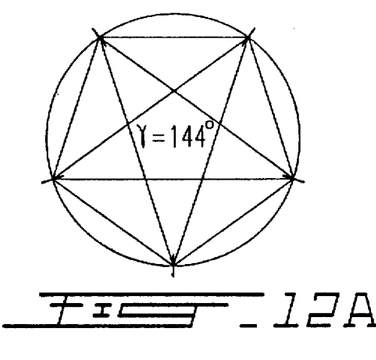
Figure 12B:
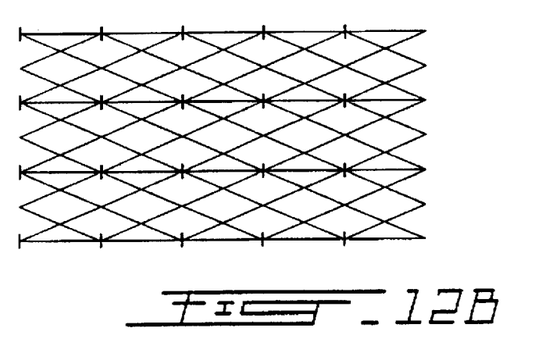
Figure 13A:
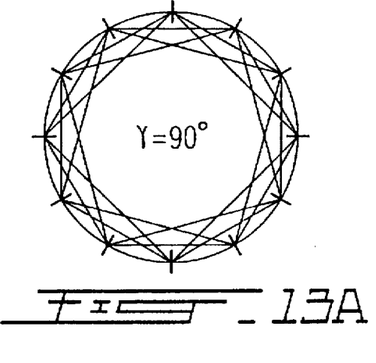
Figure 13B:
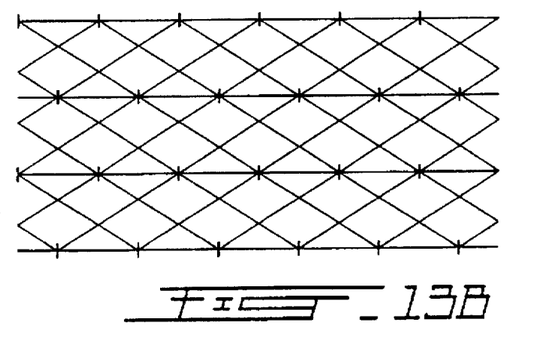
Figure 14A:
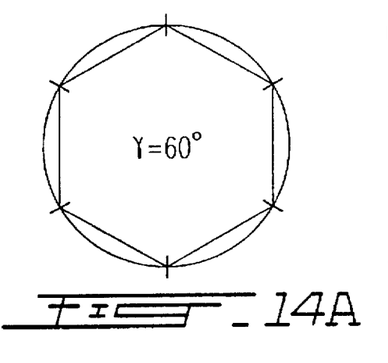
Figure 14B:
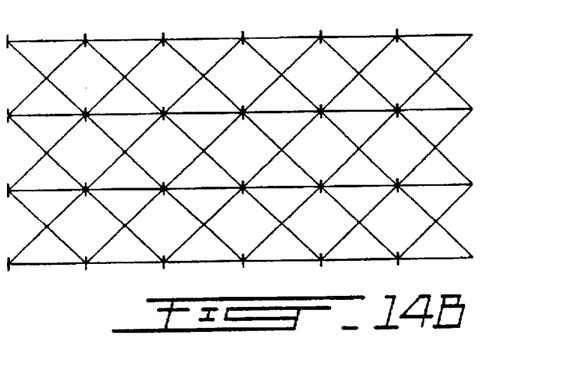
Figure 15A:
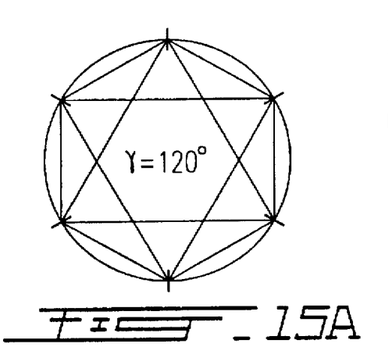
Figure 15B:
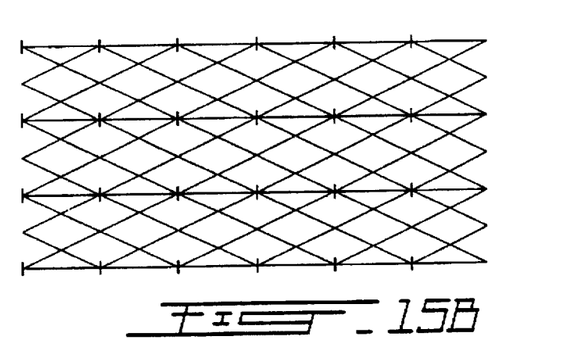
Figure 16A:
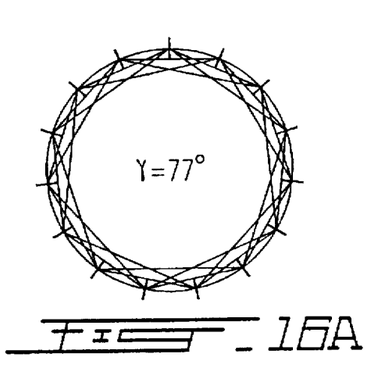
Figure 16B:
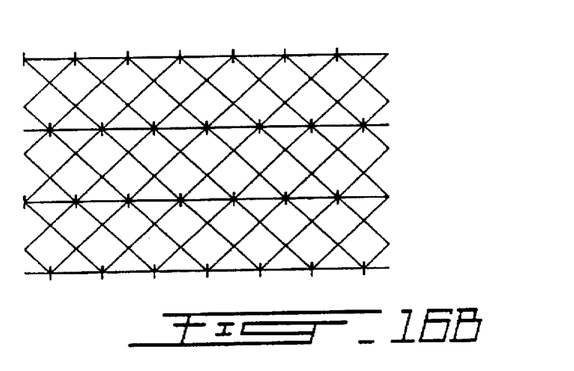
Figure 17A:
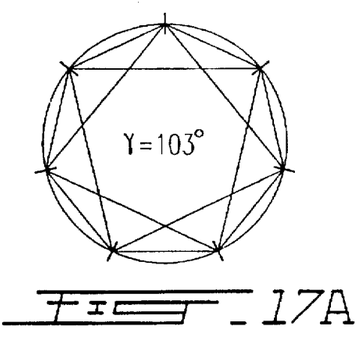
Figure 17B:
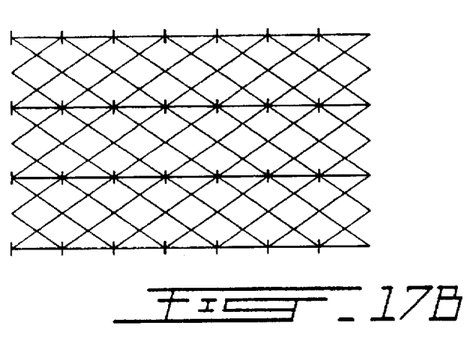
Figure 18A:
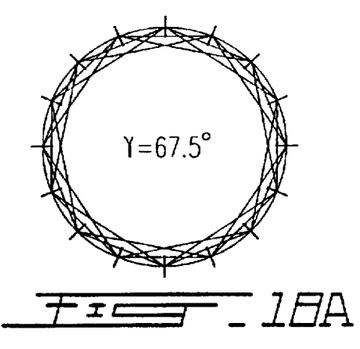
Figure 18B:
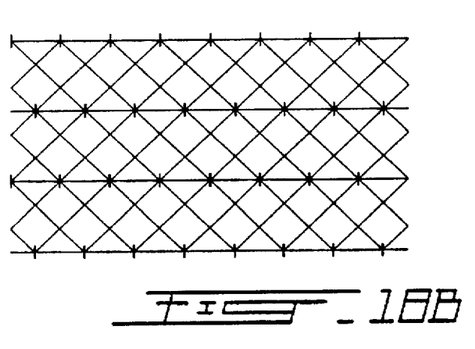
Figure 19A:
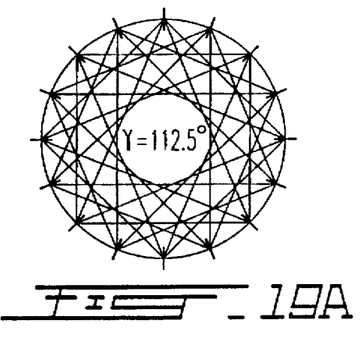
Figure 19B:
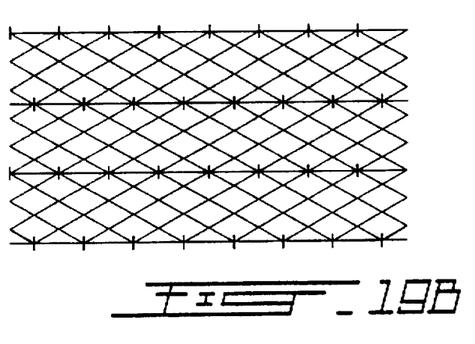
Figure 20A:
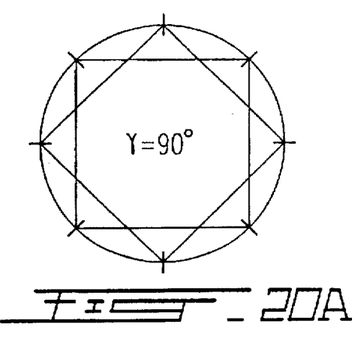
Figure 20B:
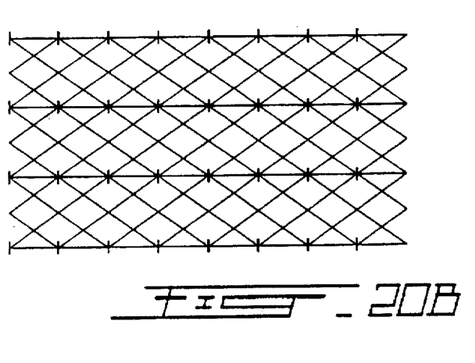
Figure 21:
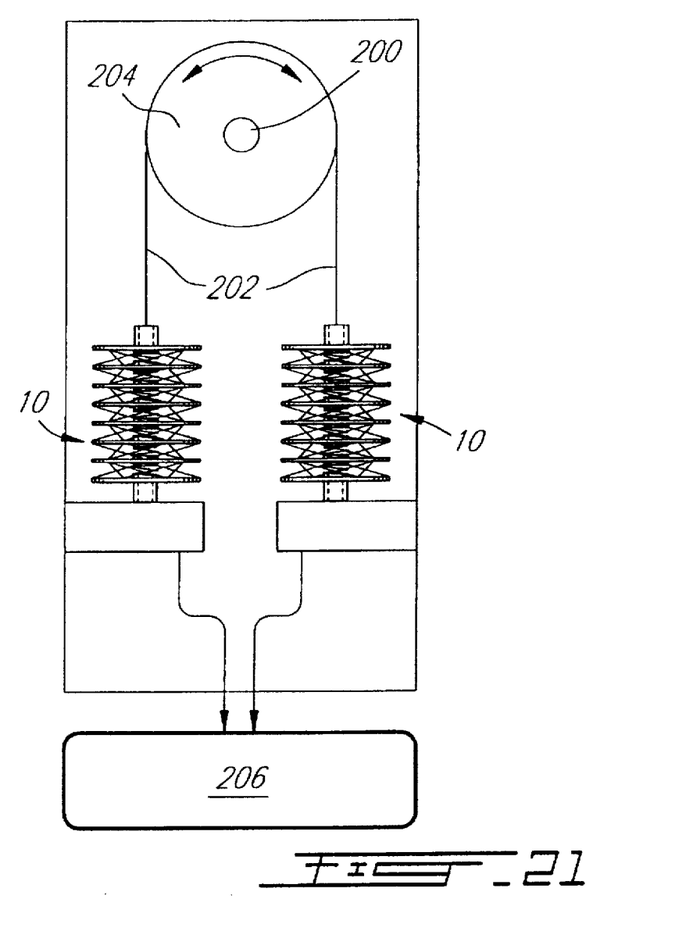
FIG. 21 is a simplified representation of two actuators of FIGS. 1A and 1B in antagonistic working relationship.

The completed weave or cage of fibers in a top view and in an unraveled disk is illustrated in FIGS. 8A and 8B, respectively.

Other completed weaves in top view and in an unraveled disk are illustrated in FIGS. 9A and 9B, 10A and 10B, 11A and 11B, 12A and 12B, 13A and 13B, 14A and 14B, 15A and 15B, 16A and 16B, 17A and 17B, 18A and 18B, and 19A and 19B, and 20A and 20B, respectively.

The force generated by the actuator can be adjusted by choosing the number and size of fibers used in the weave. The more fibers that are acting collectively, the larger the force generated. Again there is a limitation here on the number of fibers that can be used. As the number of fibers increases so does the fiber interference in the weave. Fibers with a larger diameter can be chosen, but at the expense of response as cooling times will increase. To obtain a fast response, one hundred micron fibers were chosen for the actuator prototype. Twelve 100 micron fibers acting collectively, allow rapid cooling in ambient air without compromising strength. Table 1 shows a number of actuator configurations. The effect on the displacement gain is given by the length L, with a normalized radius.

TABLE 1

Table of actuator configurations

| Notches | | | Offset Angle | Length |
|---|---|---|---|---|
| num | angle | # of fibers | γ | L |
| 8 | 45 | 16 | 67.5 | 1.111 |
| | | | 90 | 1.414 |
| | | | 112.5 | 1.663 |
| 7 | 57.5 | 14 | 86.2 | 1.367 |
| | | | 115 | 1.687 |
| 6 | 60 | 12 | 60 | 1.000 |
| | | | 90 | 1.414 |
| | | | 120 | 1.732 |
| 5 | 72 | 10 | 72 | 1.176 |
| | | | 108 | 1.618 |
| 4 | 90 | 8 | 90 | 1.414 |
| | | | 135 | 1.848 |

The configurations in Table 1 are illustrated in FIGS. 8A, 8B; 9A, 9B; 10A, 10B; 11A, 11B; 12A, 12B; 13A, 13B; 14A, 14B; 15A, 15B; 16A, 16B; 17A, 17B; 18A, 18B; 19A, 19B; and 20A and 20B.

The numerous configurations available result in a rich design space. Table 2 summarizes the various tradeoffs in designing a shape memory alloy actuator.

TABLE 2

Table of design tradeoffs

| Desired property | How | Trade-off |
|---|---|---|
| Increase displacement gain | increase disk radius | increase in size |
| | decrease d | decrease in stroke per cell |
| Increase force | increase fiber diameter | slower response |
| | increase fiber # | increase in fiber interference |
| Increase stroke | increase weave pitch | decrease in displacement gain |
| | increase disk radius | increase in size |
| | increase # of cells | increase in size |
| Increase response | decrease fiber diameter | decrease in force |
| Decrease in size | decrease disk radius | decrease in displacement gain |
| | decrease # of cells | decrease in stroke |

The actuator prototype of FIGS. 1A and 1B is hand woven. The supporting disks 12 to 26 all have a threaded center so that they can be mounted on a threaded shaft. The disks 23 to 26 are placed on the shaft alternately with the preloading springs 30. The proper alignment of successive disks 12 to 26 was accomplished via guideholes drilled in the disks corresponding to the desired offset angle. For the actuator prototype 10, four guide holes were required offset by 90°. Once the support disks were mounted and the proper separation distance d, determined for the desired displacement gain, the disks were fixed to the center shaft by two nuts at each end of the actuator. The weave was then achieved by rotating the center shaft as the fiber 28 was woven from end disk 12 to end disk 26. In this manner it was possible to mechanically connect many tensile elements collectively, quickly and securely. After the weave was completed the two ends of the fiber were merely tied in a knot. This also provided a secure mechanical connection as most of the stress on the fiber occurs at the notches 32. If the fibers in the actuator only exhibit the one way shape memory effect, it is necessary to force bias individual actuators so that they will return to their original length when cooled. This can easily be accomplished by using biasing springs or by using actuators in an antagonistic fashion. Shape memory alloys are especially suited to antagonistic arrangements since the force required to deform the alloy is much less than the force generated by the phase transformation. Using the actuators in an antagonistic fashion also results in improved system response. The response time of the actuator system will then strongly depend on heat activation, which can be tuned according to the input current amplitude.

As illustrated in the drawings, for example, FIGS. 1A and 1B and 6, a single fiber or multiplicity of fibers 28 are suitably entrained between a plurality of compression or support members such as disks 12 to 26, the plurality typically being greater than 2. The compression or support members are urged into spaced apart relationship by preloaded springs 32 which are typically disposed within inner zone 37 of cage 35 illustrated in FIG. 6.

The compression or support member suitably has a radial symmetry such as is provided by a disk, however, star-shaped members or polygonal members having radial symmetry are also appropriate.

The compression or support members are desirably lightweight and electrically non-conducting, for example, they may be of anodized aluminium or aluminium having an electrically insulating coating. Low thermal capacitance and low thermal conductivity are also desirable properties, so the members may be made of heat resistant plastics, ceramics, or other materials having these properties.

The shape memory alloy fibers 28 are heated in order to effect the phase transformation, and such heating may be achieved by passage of an electrical current through the fibers. In order to achieve this the actuator 10 may include electrical connection means for conduction of electricity into the fibers 28 at disk 12 and out of fibers 28 at disk 26.

Thus, for example, electrically conductive contact plates may be mounted on or serve as disks 12 and 26 to establish electric contact with fibers 28, so that a source of electricity may be electrically connected to the contact plate on disk 12 with the contact plate on disk 26 connected to the ground or to the electrical source to complete an electrical circuit.

Alternatively the 2 ends of the fiber can be electrically connected resulting in a serial connection. This has the advantage of increasing the resistance and lowering the required current.

In the preferred embodiment in which the cage 35 of lengths of fiber defines a helicoidal array that is symmetrical so that radial components of tension forces in the fiber or fibers of the cage 35, balance to zero leaving only an axial component of tension forces of the fiber or fibers.

Applications for the actuator of the invention include toys, camera shutters for aerospace, micro manipulators, biomedical devices, and appliances and indeed any assembly or device wherein there is a need for effecting a displacement of a component.

As shape memory alloys are capable of absorbing great quantities of mechanical energy upon deformation resulting from an impact, they can be used to realize compact shock absorbers, accomplishing the reverse function of an actuator, that of absorbing rather than generating mechanical energy. The invention described in a preferred embodiment may lend its advantageous properties of optimal use of materials to realize shock absorbers having great efficiency and compactness. These absorbers will be subject to exactly the same design principles and rules that govern the design of the actuators.

As shape memory alloys are capable of undergoing large deformations before breaking opposing a relatively constant force against strain, an effect termed the superelastic effect, they can be used to realize superelastic fixture, attachments or clamps. The invention described in a preferred embodiment may lend its advantageous properties of optimal use of materials to realize superelastic fixtures, attachments or clamps having the superelastic domain amplified many fold. These fixtures will be subject to exactly the same design principle and rules that govern the design of the actuators.

Alternate structures subject to the same design principles and rules may be reused replacing all active tensile elements by active compression members and compression members by tensile elements.

Variations of the basic unit illustrated in FIG. 2 are illustrated in FIGS. 2A, 2B, 2C and 2D.

Figure 2B:
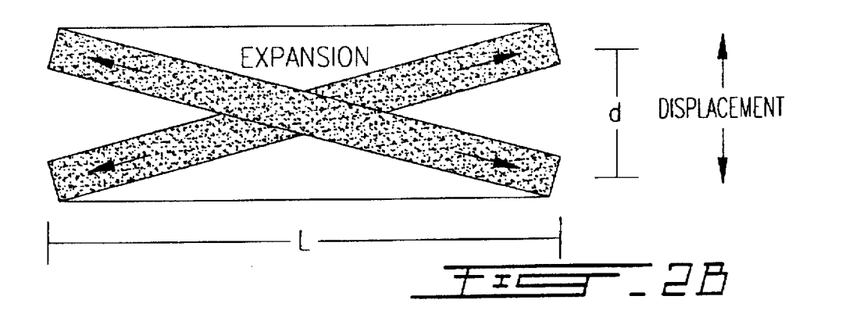

In FIG. 2B the crossing lengths defining the cage are active elements in the form of expansion members 144 and 146, which may be, for example, piston and cylinder units or thermal expansion vessels and the passive support members 140 and 142 are fiber elements. On expansion of members 144 and 146, the displacement d increases.

Figure 2C:
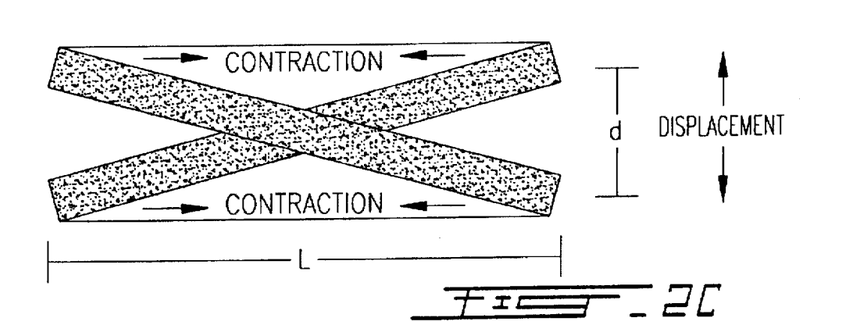

In FIG. 2C the crossing lengths defining the cage are passive support members 240 and 242 and the active elements are tensile fibers 244 and 246 which shorten under activation.

On contraction of fibers 244 and 246 the displacement d increases.

Figure 2D:
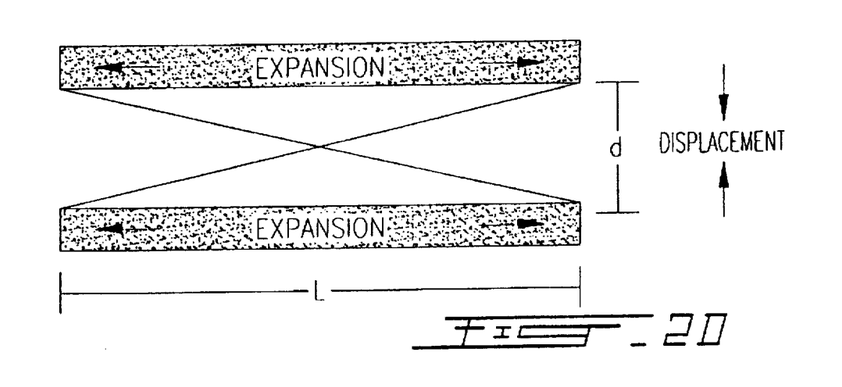

In FIG. 2D the crossing lengths defining the cage are passive support members in the form of fibers 340 and 342 and the active elements are expansion members 344 and 346, for example, piston and cylinder units. On activation of the expansion members 344 and 346 the displacement d, decreases.

In FIG. 2B the passive members 140 and 142 may be in the form of restraining harnesses or loops of the fiber elements.

Thus for each structure described hereinbefore there corresponds a dual structure subject to the same design principles and rules realized by replacing the active tensile elements by active compression elements and the passive compression members by passive tensile elements. Upon expansion of such active compression members the entire structure will expand with a displacement amplification that follows the rules described above. Such a structure will have the same advantages of efficiency and optimal use of materials. This will apply equally to the realization of actuators and shock absorbers.

Thus in the present invention an actuator develops a large displacement from tensile elements which shorten by a small amount under activation; the tensile elements can be a fiber or fibers, for example, shape memory fibers, or other active tensile elements undergoing shortening strain under activation. The fiber or fibers are entrained between opposed, spaced apart compression members typically a stack of spaced apart disks, the entrained fibers define a cage of crossing lengths of fiber in symmetrical array typically a double helicoidal array; the cage surrounds an inner zone free of interferences which can be used to lodge, if needed, springs to urge the compression members apart and keep the structure stable when not in use. The inner zone can also be used to contain another concentric actuator, etc. Activation of the fibers shortens the fiber lengths producing an amplified relative displacement of the complete structure which can be translated to a component which is to be displaced, and to which the actuator is operably connected.

The displacement amplification is accomplished efficiently, which is a most unusual and important feature of the arrangement.

The fibers shorten by a small amount which the structure amplifies by a large factor in an efficient manner; the structure is simple, optimally light and compact; this feature overcomes the limitations of strain-based mechanical transducers (shape memory alloys, magnetostrictive alloys, piezo electric materials, contractile polymers) employed to manufacture actuators.

If the tensile elements are replaced by active compression members that expand instead of contract and the compression members by tensile members (strings, cables, etc.), a dual structure is created which will accomplish the same amplification effect and have the same efficiency advantages but will expand instead of contract.

Figure 22:
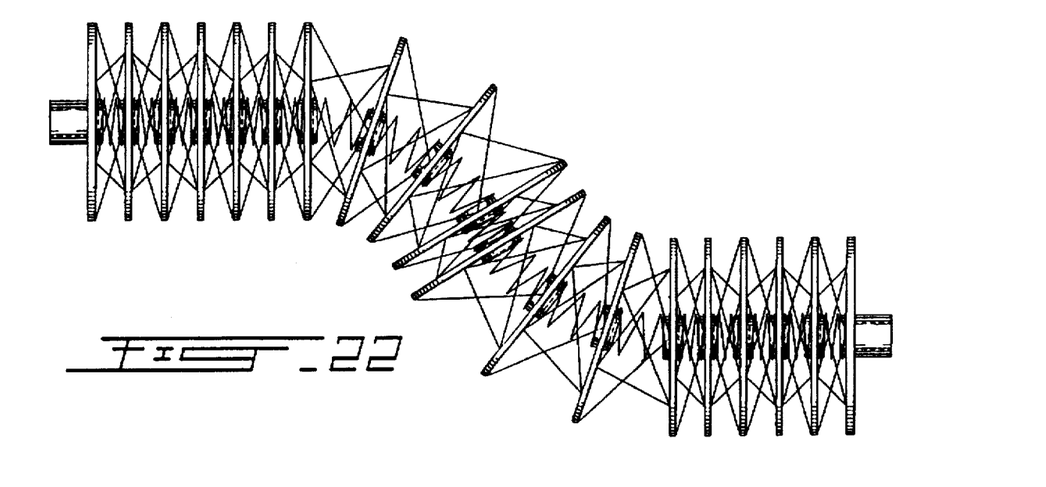
FIG. 22 is a simplified representation of an actuator employing unequal actuation of active elements of a unit.

In practicing the invention it is possible to carry out the activation so that not all of the active elements are activated at the same time, or by the same degree. Thus, for example, active elements of opposed sides of the cage might be activated in an intermittent, alternating relationship to produce a bending motion with alternating periodicity. Such a bending motion for an actuator of the type illustrated in FIG. 1A is shown in FIG. 22.

We claim:

1. An actuator comprising:
   at least one fiber which shortens under activation, entrained between at least first and second support members,
   said support members being in opposed, spaced apart relationship,
   the entrained at least one fiber defining a cage of crossing lengths of fiber in symmetrical array,
   said cage surrounding an inner zone between said support structure members.

2. An actuator according to claim 1, wherein said at least one fiber is entrained between a plurality of said support members, said plurality being greater than 2.

3. An actuator according to claim 2, wherein said cage is defined by a multiplicity of fibers which shorten under activation.

4. An actuator according to claim 3, further including spring means between adjacent support members of said plurality said spring means being disposed within said inner zone.

5. An actuator according to claim 3, wherein said support members have a radial symmetry and said symmetrical array is a helicoidal array effective to balance all radial components of tension forces in the at least one fiber to zero, leaving only an axial component of tension forces of the at least one fiber.

6. An actuator according to claim 5, wherein said fibers are of a shape memory alloy.

7. An actuator according to claim 6, wherein said fibers shorten during phase transition of the alloy upon being heated.

8. An actuator according to claim 7, wherein said support members are disks and said first and second members are outer end disks of said plurality, said actuator including electrical connection means for conduction of electricity into said fibers at said first outer end disk and out of said fibers at said second end disk.

9. An actuator according to claim 1, wherein said at least one fiber is of a shape memory alloy.

10. An actuator for development of a displacement from a force comprising:
    at least one fiber which shortens under activation, entrained under strain between at least first and second support members in a double helicoidal array,
    said support members being in opposed, spaced apart relationship,
    said double helicoidal array being effective to balance all radial components of tension forces of the at least one fiber.

11. An actuator according to claim 10, wherein said helicoidal array defines a cage of crossing lengths of fiber.

12. An actuator according to claim 11, wherein said at least one fiber is of a shape memory alloy and said at least one fiber shortens during phase transition of the alloy upon being heated.

13. An assembly comprising:
    a component to be displaced, and
    an actuator to effect displacement of the component,
    said actuator comprising at least one fiber which shortens under activation, entrained between at least first and second support members,
    said support members being in opposed, spaced apart relationship,
    the entrained at least one fiber defining a cage of crossing lengths of fiber in symmetrical array,
    said cage surrounding an inner zone between said support members,
    said component being Operably connected to said second member such that displacement of said second member relative to said first member produces a corresponding displacement of said component.

14. An assembly according to claim 13, wherein said support members have a radial symmetry and said symmetrical array is a helicoidal array effective to balance all radial components of tension forces in the at least one fiber.

15. An assembly according to claim 14, wherein said cage is defined by a multiplicity of fibers which shorten under activation, said fibers being entrained between a plurality of said support members, said plurality being greater than 2; said support members being disks, and
    said fibers being of a shape memory alloy, said fibers shortening during phase transition between phases of the alloy upon being treated.

16. A method of developing a displacement from a force comprising:
    providing at least one fiber which shortens under activation, entrained between at least first and second support members, the entrained at least one fiber defining a cage of crossing lengths of fiber in symmetrical array,
    activating said at least one fiber to shorten said fiber lengths such that said second support is displaced towards said first support member.

17. A method according to claim 16, wherein said second support member is operably connected to a component to be displaced.

18. A method according to claim 16, wherein said at least one fiber comprises a multiplicity of fibers and said fibers are entrained between a plurality of said support members, said plurality being greater than 2, said fibers being of a shape memory alloy and said activating comprises heating said fibers to effect a phase transition to shorten said fiber lengths.

19. A method according to claim 18, wherein adjacent support members are urged apart under spring pressure.

20. A deformable structural arrangement comprising:
    active element means operatively associated with passive support means,
    said active element means having a major axis adapted to change in length under activation and wherein said active element means comprise at least one fiber which shortens under activation or stretches under stress, one of said active element means and said passive support means defining a cage of crossing lengths in symmetrical array, said cage surrounding an inner zone bounded by said active element means and said passive support means, said passive support means comprises:
    at least first and second support members made of compression members,
    said support members being in opposed, spaced relationship,
    said at least one fiber being entrained between said at least first and second support members,
    the entrained at least one fiber defining a cage of crossing lengths in symmetrical array forming a double helical counter rotating pattern,
    said cage surrounding an inner zone free of interferences.

21. A structural arrangement according to claim 20, in the form of an actuator or a shock absorber.

22. An actuator or shock absorber according to claim 20 wherein said support members have a radial symmetry and said symmetrical array is a helicoidal array effective to balance all radial components of tension forces in the at least one fiber to zero, leaving only an axial component of tension forces of the at least one fiber.

23. An assembly comprising:
    a component which is displaceable, and
    a shock absorber to eliminate displacement of the component,
    said shock absorber comprising active elements of at least one fiber which stretches under stress, entrained under stress between at least first and second support members, said support members being in opposed, spaced apart relationship, the entrained at least one fiber defining a cage of crossing lengths of fiber in symmetrical array, said cage surrounding an inner zone between said support members, said component being operably connected to said second member such that displacement of said second member relative to said first member eliminates a corresponding displacement of said component.

24. An assembly according to claim 23, wherein said support members are made of compression members in a regular star or polygonal disposition or disks with notches at the vertices of regular polygonals and said symmetrical array is a helicoidal array effective to balance all radial components of tension forces in the at least one fiber, and said cage is defined by a multiplicity of active tension elements which shorten under activation or stretch under stress, said tension elements being made of at least one fiber entrained between a plurality of said support members, said plurality being greater than 2; said support members being made of compression members or disks, and said at least one fiber being of a shape memory alloy, which shortens during phase transition upon being treated, or being of shape memory alloy and stretching upon application of stress and undergoing phase transition.

25. A method of eliminating a displacement with a force comprising:

providing active elements of at least one fiber which stretches under stress, entrained between at least first and second support members, the entrained at least one fiber defining a cage of crossing lengths of fiber in symmetrical array, and stressing the at least one fiber to stretch the fiber lengths thereby displacing said second support member away from said first support member to eliminate a displacement of said second support member.

26. A method according to claim 25, wherein said at least one fiber comprises a multiplicity of fibers and said fibers are entrained between a plurality of said support members, said plurality being greater than 2.

* * * * *